United States Patent Office 3,267,309
Patented August 16, 1966

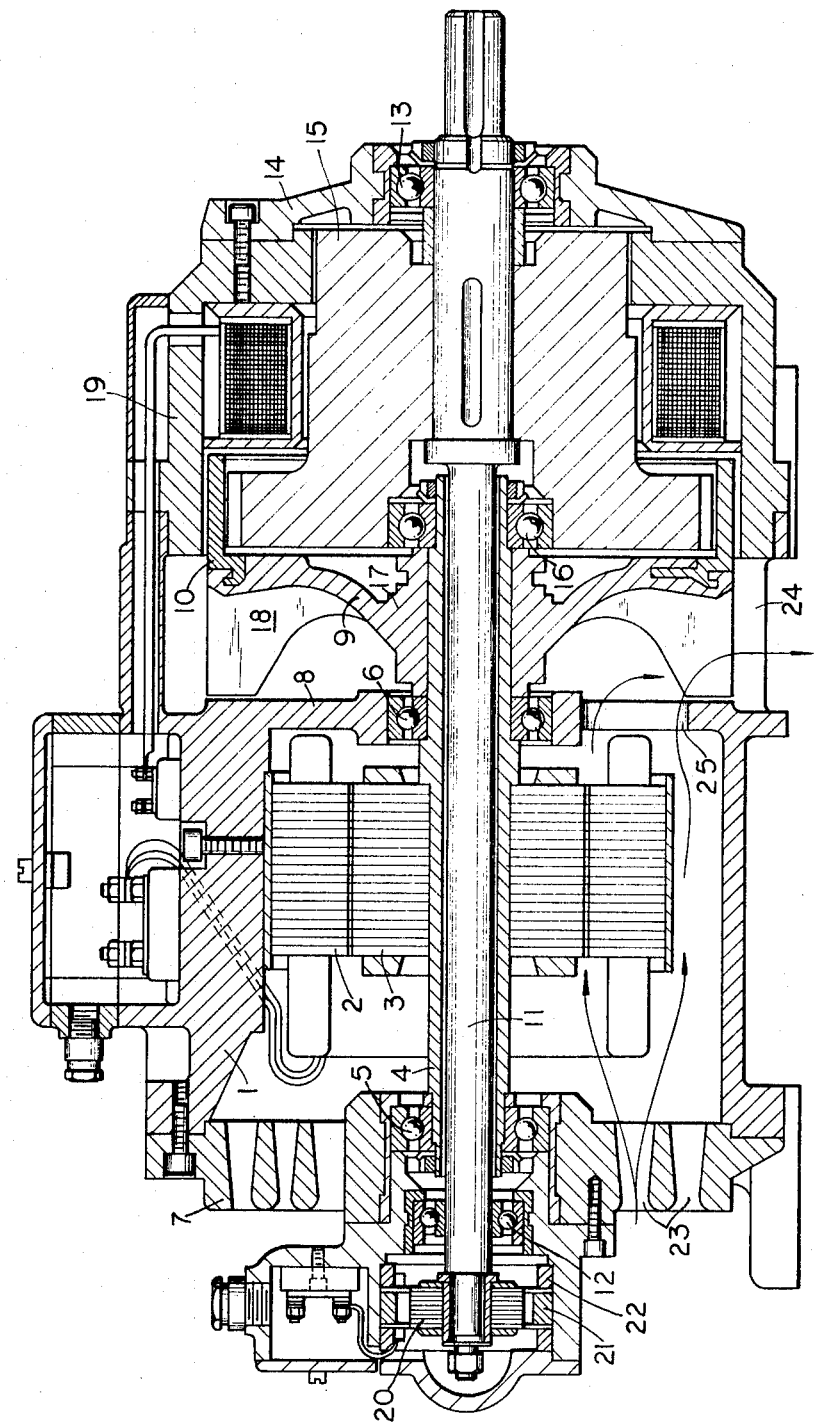

3,267,309
VARIABLE-SPEED ALTERNATING-CURRENT MACHINES
Elie Cohen, 89 bis, Rue Bobillot, and Szymon Roth, 18 Blvd. Barbes, both of Paris, France
Filed June 26, 1963, Ser. No. 290,860
Claims priority, application, France, June 28, 1962, 902,322, Patent 1,339,565
8 Claims. (Cl. 310—98)

The present invention relates to variable-speed alternating-current machines incorporating electromagnetic eddy-current coupling or braking devices.

Such machines frequently comprise an asynchronous motor whose rotor is mounted on a common shaft together with the outer rotor of the electromagnetic coupling, the inner rotor of the coupling being mounted on a further shaft, the inner and outer rotors and the coupling stator lying coaxial with each other.

Machines of this kind have been described in our U.S. Patents Nos. 3,178,598 and 3,229,132.

It is an object of this invention to provide an improved variable-speed alternating-current machine in which the shaft on which the rotor of the motor and the outer rotor of the coupling are mounted and the shaft on which the inner rotor of the coupling is mounted are more adequately supported in bearings.

In accordance with this invention we provide an improved variable-speed alternating-current machine in which each of the two shafts referred to is supported between two bearings, each of the bearings being supported by the casing of the machine.

In one particular embodiment the rotor of the asynchronous motor and the outer rotor of the electromagnetic eddy-current coupling are mounted on a hollow shaft rotating in two bearings rigidly fixed to the fixed frame or casing of the machine while the inner rotor of the coupling is mounted on another shaft, extending through the hollow shaft and mounted in two other bearings also rigidly fixed to the fixed machine casing.

Preferably the hollow shaft is also supported by a bearing which is housed in the inner rotor.

In order that the invention can be fully understood, one embodiment thereof will now be described, by way of example, with reference to the accompanying drawing the sole figure of which shows a longitudinal section of a machine according to the invention.

In this drawing, a common frame 1 carries the magnetic poles and the windings of a stator 2 of an asynchronous motor, and an electromagnetic coupling stator 19. The rotor 3 of the motor is carried by a hollow shaft 4.

The hollow shaft 4 is supported on each side of the rotor 3 by two bearings 5 and 6, carried respectively by a cup in an outer plate 7 and an inner plate 8 of the frame 1 forming an apertured partition.

Part of the hollow shaft 4 extends beyond the bearing 6 and has a hub 17 of a light-alloy side plate 9 secured thereto, this plate carrying air-circulating blades 18 on one side. To the other side of the plate 9 there is secured a cylindrical portion 10, made of magnetic steel, forming part of the outer rotor of the electromagnetic eddy-current coupling. The connection between the plate 9 and the overhanging portion 10 may be effected by fusion in the normal way. The fan constituted by blades 18 aspirates air axially through openings 23 in the end plate 7 and through openings 25 of partition 8 and drives it out radially through openings 24 in a peripheral wall of the frame of the machine.

A solid shaft 11 extends through the shaft 4 and is supported at each end by two bearings 12 and 13 carried by the frame of the machine. Bearing 12 lies in the same cup, carried by the plate 7, as the bearing 5, and bearing 13 is carried by an outer plate 14.

The inner rotor 15 of the electromagnetic coupling is keyed to that part of the shaft 11 which lies between the plate 9 and the bearing 13, and is supported at one end by this bearing 13 and at the other end by a bearing 16 which bears on the end of the hollow shaft 4.

The machine so constructed has considerable advantages. In particular, the guiding and centering of the various rotating parts is effected far more satisfactorily than in machines in which only the shaft carrying the inner rotor is supported in fixed bearings, the hollow shaft being supported in bearings on this latter shaft alone. Further, since the distance between the bearings supporting the two coupling rotors is short, these rotors are very adequately supported and there is no risk of their "adhering" to each other or to the stator by reason of the forces of magnetic attraction.

The placing of the fan is such that it plays a double role; on the one hand, it draws in and discharges the cooling air for the motor and, on the other hand, its blades constitute a large-area radiating surface which facilitates the dissipation of heat generated by the eddy currents in the outer rotor of the coupling. Moreover, by virtue of this positioning of the fan, the air does not circulate axially through the air gaps of the coupling, so that the possibility of dust being deposited in these gaps is minimised.

The machine described may also comprise in the usual way a tachometer alternator with a rotor 20, keyed to the end of the shaft 11, and with a stator 21 having a winding 22.

Although there has been described and shown what is considered to be a preferred embodiment of the invention, it will be apparent that many changes may be made without departing from the essential spirit of the invention. It is intended, therefore, in the annexed claims to cover all such changes and modifications as fall within the scope of the invention as defined in the appended claims.

We claim:

1. A variable-speed alternating-current machine comprising:
    a casing,
    an asynchronous motor having a stator and a rotor mounted within said casing,
    an eddy-current coupling or braking device having inner and outer rotors coaxial with each other and mounted within said casing,
    a tubular shaft on which said rotor of the motor and said outer rotor of said eddy-current device are mounted, and
    a further shaft extending through said tubular shaft and having said inner rotor of said eddy-current device mounted thereon, said tubular shaft and said further shaft each being supported at spaced locations along their length by at least two bearings mouted in said frame, said tubular shaft being additionally supported in a bearing housed in said inner rotor.

2. A machine according to claim 1, wherein said outer rotor comprises
    a supporting member secured to said tubular shaft, and
    a tubular portion extending from one side of said supporting member and surrounding part of said inner rotor, the other side of said supporting member being provided with a plurality of fan blades operative as an air circulator upon rotation of said tubular shaft.

3. A machine according to claim 2, wherein the casing has an end plate defining a plurality of openings adjacent the asynchronous motor and a circumferential portion defining a plurality of openings adjacent said fan blades whereby cooling air is aspirated axially through said motor and discharged radially, said cooling air following a flow path remote from said tubular portion of the outer rotor and the said inner rotor of the eddy-current device.

4. A machine according to claim 3, wherein said tubular portion of the outer rotor is fused to said supporting member.

5. A machine according to claim 3 further comprising a tachometric alternator secured to one end of said further shaft.

6. A variable-speed alternating current machine comprising:
- a casing having two end plates,
- a first shaft extending through said casing and supported in two bearings respectively housed in said two end plates,
- a tubular second shaft coaxial with, and surrounding, said first shaft and supported in two further bearings, one of said further bearings being housed in one of said end plates and the other of said further bearings being housed in a partitioning wall integral with said casing,
- an asynchronous motor having a rotor mounted on said first shaft further having a stator,
- an eddy-current coupling or braking device axially spaced from said motor and having an outer rotor mounted on said first shaft and an inner rotor mounted on said second shaft, and
- a fan coupled to said first shaft and located between said motor and said eddy-current device, said tubular shaft being additionally supported in a bearing housed in said inner rotor.

7. A machine according to claim 6, wherein said outer rotor comprises
- a tubular member secured to and extending from one side of a supporting member and surrounding part of the inner rotor, and wherein said fan comprises
- a plurality of blades integral with and extending from the other side of said supporting member.

8. A machine according to claim 7, wherein said one of said end plates defines a plurality of first openings, said partitioning wall defining a plurality of second openings, said casing having an external peripheral wall defining a plurality of third openings adjacent said blades, whereby cooling air is drawn in axially through said first and second openings and is discharged radially through said third openings.

References Cited by the Examiner
UNITED STATES PATENTS
3,167,674  1/1965  Woodward _____ 310—105

MAX L. LEVY, *Primary Examiner.*

DAVID X. SLINEY, *Examiner.*